(12) United States Patent
Arai

(10) Patent No.: US 6,380,998 B1
(45) Date of Patent: Apr. 30, 2002

(54) LCD DEVICE HAVING A BACK LIGHT

(75) Inventor: Nobuhiro Arai, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/638,965

(22) Filed: Aug. 15, 2000

(30) Foreign Application Priority Data

Aug. 17, 1999 (JP) ............................................. 11-230948

(51) Int. Cl.[7] ............................................ G02F 1/1345
(52) U.S. Cl. .......................... 349/152; 349/113; 349/59
(58) Field of Search ................................ 349/152, 113, 349/59

(56) References Cited

U.S. PATENT DOCUMENTS

| | | | |
|---|---|---|---|
| 5,029,984 A | * | 7/1991 | Adachi et al. ............... 350/334 |
| 5,293,262 A | * | 3/1994 | Adachi et al. ................ 359/88 |
| 5,899,549 A | * | 5/1999 | Nakanishi et al. ............ 349/59 |
| 6,160,349 A | * | 12/2000 | Nagai .......................... 315/85 |

FOREIGN PATENT DOCUMENTS

| | | | |
|---|---|---|---|
| JP | 4-371924 | 12/1992 | ......... G02F/1/1335 |
| JP | 11-305205 | * 11/1999 | |

* cited by examiner

*Primary Examiner*—Kenneth Parker
*Assistant Examiner*—David Chung
(74) *Attorney, Agent, or Firm*—Hayes, Soloway, Hennessey, Grossman & Hage, P.C.

(57) ABSTRACT

A LCD device has a LCD panel and a drive TCP for driving the LCD panel. Back light is guided to the rear surface of the LCD panel by a light-conductive sheet. The leakage back light passed the rear surface of the light-conductive sheet is reflected by a reflecting plate having a conductive film at the rear surface of the reflecting plate. The conductive film is connected to a ground pattern of the printed circuit board which transfers signals to the drive TCP. The reflecting plate has both functions for reflecting back light and shielding the LCD panel against the noise generated by the printed circuit board.

7 Claims, 3 Drawing Sheets

LCD DEVICE HAVING A BACK LIGHT

BACKGROUND OF THE INVENTION (a) Field of the Invention

The present invention relates to a LCD (liquid crystal display) device having a back light and, more particularly, to the structure of a reflecting plate for reflecting the back light from the rear side of the LCD panel toward the front side thereof.

(b) Description of the Related Art

A LCD device having a back light generally includes a reflecting plate at the rear side of the LCD panel, with a light-conductive sheet sandwiched between the LCD panel and the reflecting plate. The reflecting plate reflects the leakage light, which has passed through the rear surface of the light-conductive sheet, toward the front side of the LCD panel, thereby saving the light power resource. In general, the LCD panel, the light-conductive sheet and the reflecting plate have an equivalent size.

Patent Publication JP-A-4-371924 describes a structure shown in FIG. 1, wherein a printed circuit board 34 including a plurality of interconnect layers is disposed at the rear side of the LCD panel 13. The printed circuit board has a top surface covered by a uniform aluminum layer 21 which acts as a ground layer as well as a reflecting plate. A bezel 37 having a plurality of locking parts 20 is used for coupling the LCD panel 23 and the printed circuit board 34 together by adapting the bezel 37 at the front surface of the LCD panel 13. The LCD panel 13 and the printed circuit board 34 are electrically connected through flexible harnesses 19 for display of picture image. By using the uniform aluminum ground layer 21 of the printed circuit board 34 as a reflecting plate, the LCD device reduces the cost thereof by saving a dedicated reflecting plate.

In the conventional LCD device described in the publication, there are some drawbacks.

First, the size of the printed circuit board 34 is extremely large due to having a reflecting function for the back light of the LCD panel. The large size of the printed circuit board increases the total costs for the LCD device. More specifically, the cost for the printed circuit board generally depends on the number of printed circuit boards that can be obtained from a single board stuff having a fixed size.

Second, the LCD panel has irregularities in brightness of the screen. More specifically, the printed circuit board 34 generally mounts thereon a plurality of electric components such as a drive LSI for driving the LCD panel and a bypass capacitor used for a power source line for the LCD device. These electric components are generally attached onto one of the surfaces of the printed circuit board by using solder. This often generates a warped or wavy surface on the printed circuit board due to the heat generated in the soldering process. The warped or wavy surface hinders the reflecting surface of the printed circuit board from reflecting uniform light, whereby the LCD panel has the irregularities in brightness. In addition, it is usual that the electric components are mounted on the printed circuit board at the depressions of the printed circuit board which are formed for this purpose. The depressions, which hardly reflects light, also cause the irregularity or reduction in the brightness of the screen.

SUMMARY OF THE INVENTION

In view of the above, it is an object of the present invention to provide a LCD device having a reflecting plate which reflects uniform light to the LCD panel and has an additional function.

The present invention provides a LCD device including a LCD panel for displaying a picture image thereon, a light-conductive sheet disposed at a rear side of the LCD panel for conducting back light toward the LCD panel, a reflecting plate disposed at a rear side of the light-conductive sheet for reflecting the leakage back light passed through the rear surface of the light-conductive sheet, the reflecting plate having on a rear surface thereof a conductive film, and a combination of a tape carrier package (TCP) and a printed circuit board coupled to a periphery of the LCD panel, the TCP being electrically connected to the LCD panel for driving the LCD panel for display of the picture image based on signals transferred through the printed circuit board, the printed circuit board being disposed at a rear side of the LCD panel by folding the TCP toward the rear side of the LCD, the conductive film being disposed between the printed circuit board and the LCD panel.

In accordance with the LCD device of the present invention, the reflecting plate reflects the back light uniformly toward the LCD panel and, in addition, has a function for shielding the LCD panel against the noise generated by the printed circuit board. The reflecting panel having the conductive film only slightly raises the total costs for the LCD device, differently from the conventional LCD device having a large printed circuit board.

The above and other objects, features and advantages of the present invention will be more apparent from the following description, referring to the accompanying drawings.

PREFERRED EMBODIMENTS OF THE INVENTION

Figure 1:
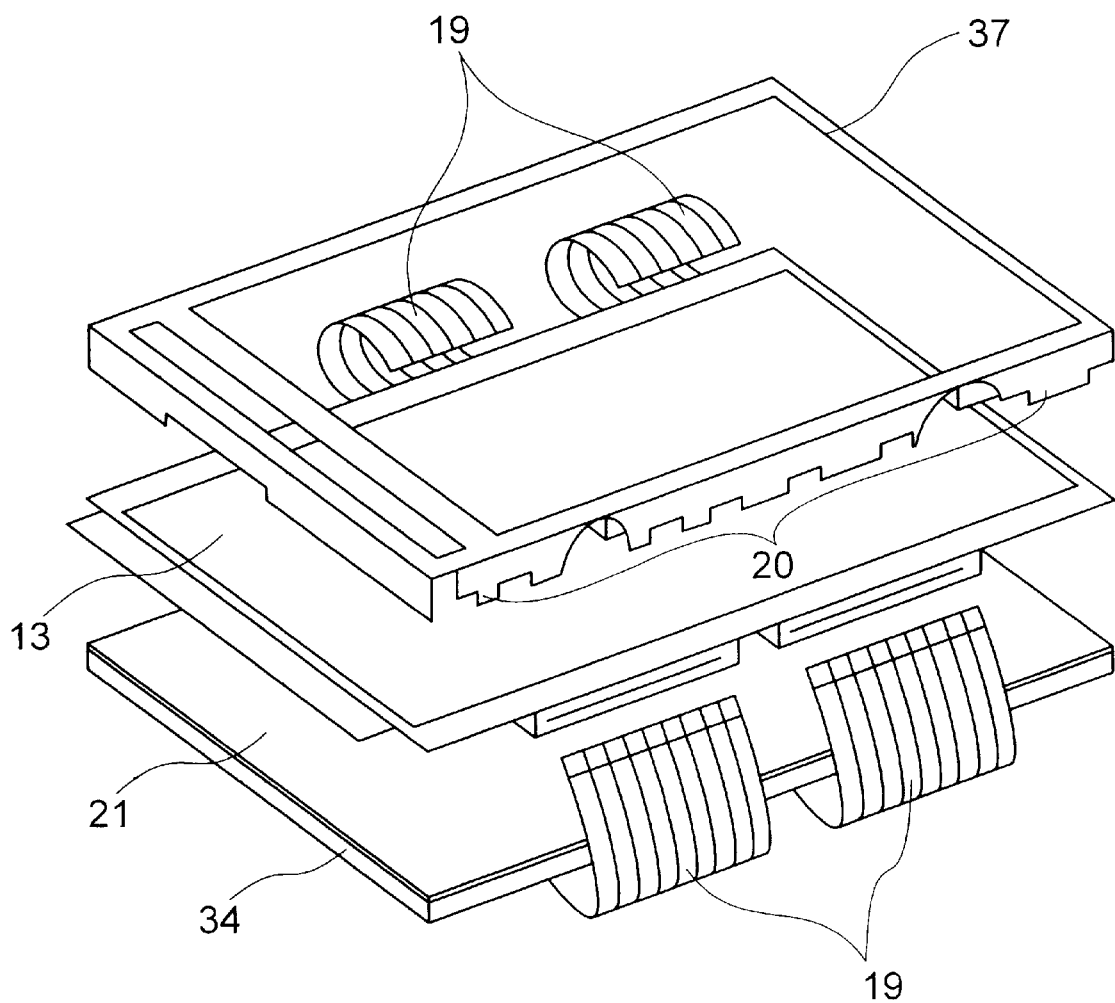
FIG. 1 is an exploded perspective view of a conventional LCD device including a printed circuit board having a light reflecting function.

Now, the present invention is more specifically described with reference to accompanying drawings, wherein similar constituent elements are designated by related reference numerals.

Figure 2:
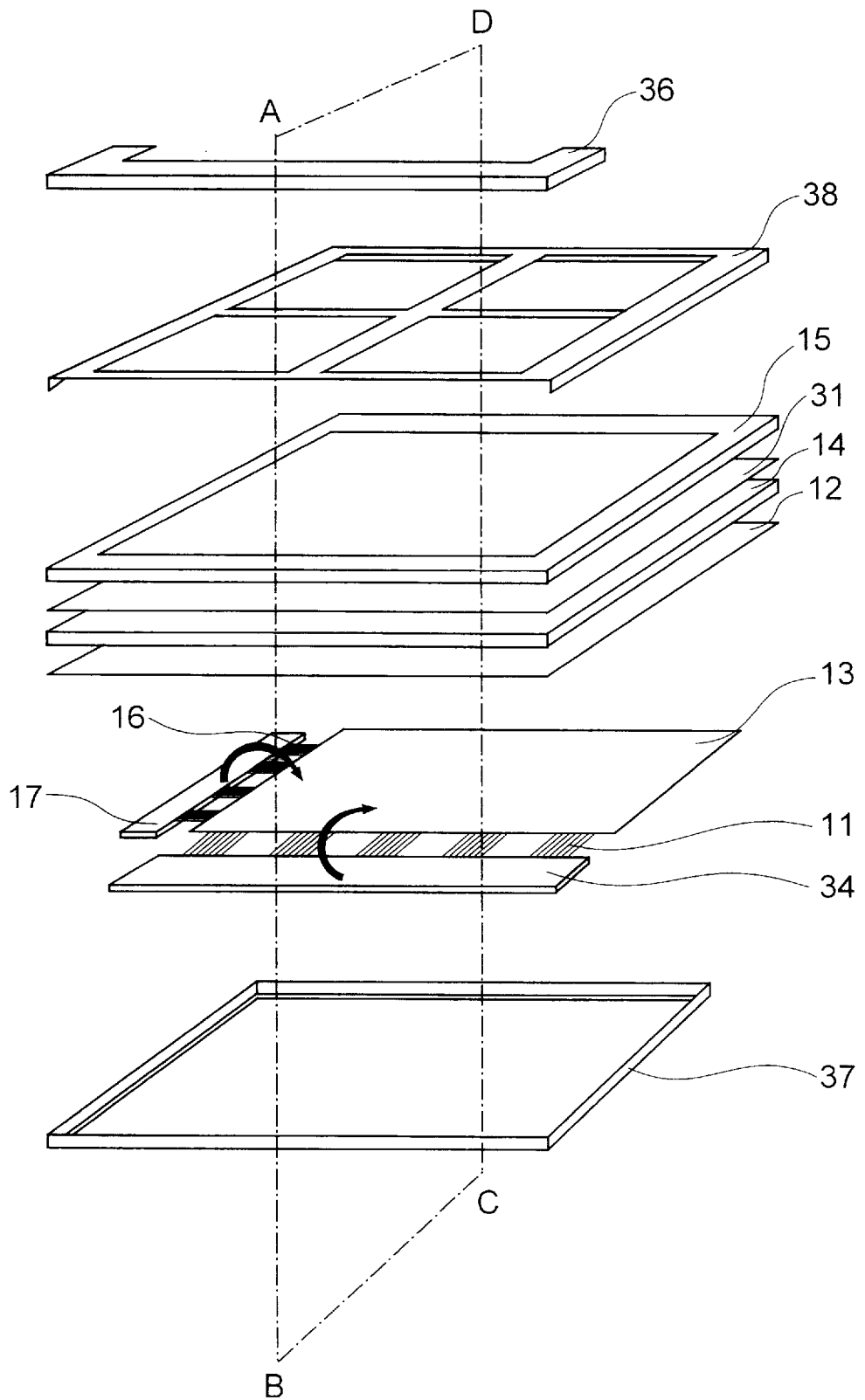
FIG. 2 is an exploded perspective view of a LCD device according to a first embodiment of the present invention.

Referring to FIG. 2, a LCD device according to a first embodiment of the present invention includes a LCD panel 13, a light-conductive sheet 14 disposed at the rear side of the LCD panel 13 for conducting back light emitted from a light source (or lamp) not shown, a prism sheet 12 sandwiched between the LCD panel 13 and the light-conductive sheet 14 for guiding the back light conducted by the light-conductive sheet 14 toward the entire area of the LCD panel 13, and a reflecting plate 31 disposed at the rear side of the light-conductive sheet 14 for reflecting the back light which has passed the rear surface of the light-conductive sheet 14. The reflecting plate 31 is covered at the rear side thereof by a conductive film, which is connected to the ground.

The prism sheet 12, light-conductive sheet 14 and reflecting plate 31 are held by a back light chassis 15 at the rear side of the LCD panel 13. A rear shield 38 reinforces the back light chassis 15 to assist the same to hold the prism sheet 12, light-conductive sheet 14 and reflecting plate 31 with respect to the LCD panel 13.

The LCD panel 13 is associated with a vertical drive LSI implemented as a first tape carrier package (TCP) 16 for driving the LCD panel 13 in the vertical direction, and a horizontal drive LSI implemented as a second TCP 11. The first TCP 16 is connected to external circuits through a printed circuit board 17, whereas the second TCP 11 is connected to external circuit through a printed circuit board 34. Each of the printed circuit boards 17 and 34 has a plurality of interconnect layers, which are layered one on another with an intervention of a resin layer therebetween. The TCPs 16 and 11 are flexible due to their structure including the base tape carrier, and are folded toward the rear side of the LCD panel 13 to allow the printed circuit board 34 to be located at the rear side of the LCD panel 13. The TCPs 16 and 11 are disposed at the edges of the LCD device, and are protected by a conductive frame which includes a bezel 37 disposed at the front side of the LCD panel 13 and a TCP shield 36 disposed at the rear side of the rear shield 38. The TCP shield 36 and the bezel 37 are made of a conductive material such as stainless steel.

Figure 3:
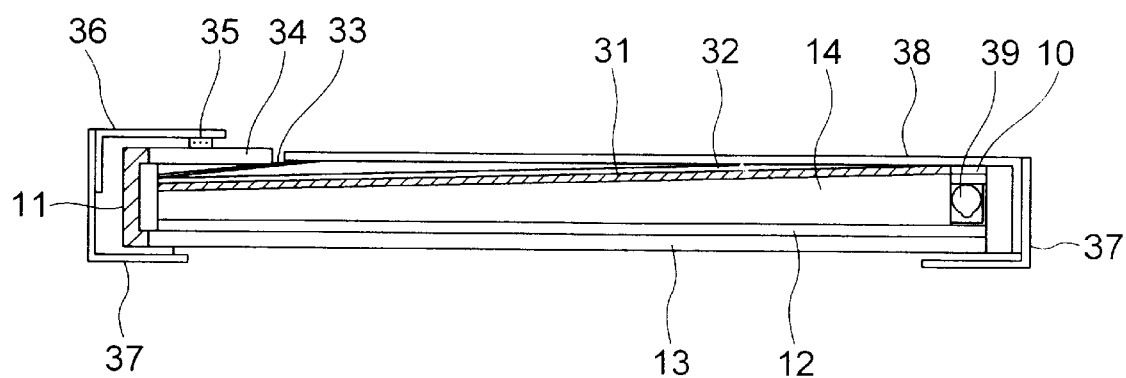
FIG. 3 is a sectional view of the LCD device of FIG. 2 as viewed normal to the plane defined by ABCD in FIG. 2.

Referring to FIG. 3 showing the LCD device of FIG. 2 as viewed normal to the plane defined by ABCD in FIG. 2. The light source 39 disposed at the right edge of the LCD device, as viewed from the front thereof, emits back light. The light-conductive sheet 14 guides the back light in the direction substantially parallel to the screen of the LCD panel 13. The light conductive sheet 14 has an inclination at the rear surface with respect to the front surface thereof, wherein the distance between the front surface and the rear surface thereof reduces along the travelling direction of the back light.

The back light guided by the light-conductive sheet 14 is directed toward the LCD panel 13 by the function of the prism sheet 12. The back light passed the rear surface of the light-conductive sheet 14 by leakage is reflected by the reflecting plate 31 and incident onto the LCD panel 13, thereby saving the light power resource. The conductive film 32 attached to or formed on the reflecting plate 31 is in direct contact with the rear shield 38 after the assembly of the LCD device. The rear shield 38 is in turn in direct contact with the bezel 37, which is in contact with the TCP shield 36. The TCP shield 36 is electrically connected to a ground pattern formed on the rear surface of the printed circuit board 34 or 17 through a contact member 35.

The printed circuit board 34 or 17 has a smaller area compared to the area of the LCD panel 13. Both the printed circuit boards 34 and 17 are disposed for opposing the conductive film 32 formed on the reflecting plate 31, with an insulator film 33 disposed between the printed circuit board 34 or 17 and the conductive film 32 for prevention of a short-circuit failure. The insulator film 33 is made of a PET polyethylene terephthalate) having a thickness of about 50 micrometers. The lamp holder 10 supports the lamp 39 and protects the same against an external impact.

The conductive film 32 is made of a metal such as Al and Cu having a thickness of about 20 micrometers. The bezel 37, the rear shield 38, the TCP shield 36 and the conductive film 32 are electrically connected to a ground pattern or line of the printed circuit board 34 through the contact member 35 disposed in contact with the ground pattern or line. Thus, the reflecting plate 31 has a reflective function for reflecting the back light and a shield function for shielding the LCD panel 13 against the noise generated by the printed circuit board 34.

The gap between the rear shield 38 and the conductive film 32 of the reflecting plate 31 is formed to have an allowance of a minus value, whereby an electric contact can be assured therebetween after fabrication of the LCD device. The conductive film 32 has a function for suppressing noise entering toward the LCD panel 13 from the rear side thereof, and a function for electrically connecting the ground pattern of the printed circuit boards 34 and 17 to the chassis or frame of the LCD device.

The conductive film 32 disposed adjacent to the printed circuit board 34 has a function as a ground layer of the printed circuit board 34, whereby a ground layer can be omitted in the printed circuit board at the front side thereof without subjecting the LCD panel 13 to the noise generated in the printed circuit board 34.

Figure 4:
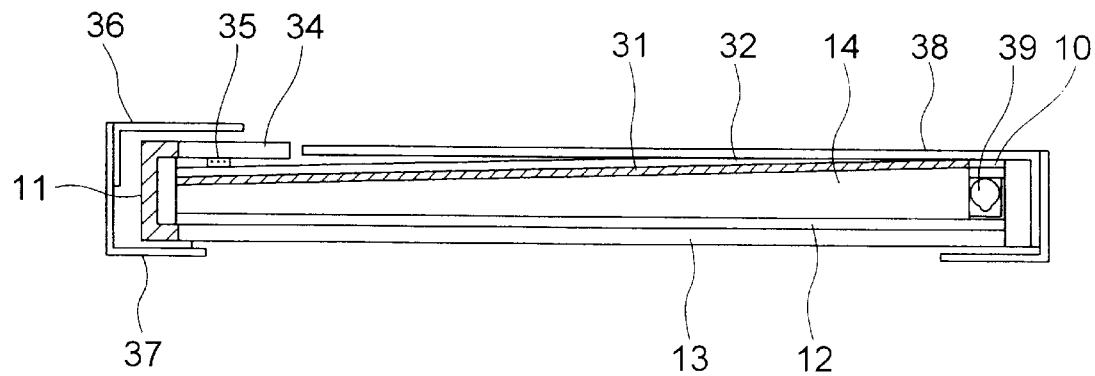
FIG. 4 is a sectional view of a LCD device according to a second embodiment of the present invention.

Referring to FIG. 4, a LCD device according to a second embodiment of the present invention has a contact member 35 made of a stainless steel having a spring function. The contact member 35 electrically connects a ground pattern of the printed circuit board 34 and the conductive film 32 formed on the rear surface of the reflecting plate 31. The conductive film 32 is formed by vacuum evaporation of a metal such as aluminum. In an alternative, the conductive film 32 may be formed by metallic plating, or may be a conductive sheet adhered onto the rear surface of the reflecting plate 31.

The conductive film 32 disposed adjacent to the printed circuit board 34 functions as a ground layer for the printed circuit board 34. Thus, a ground layer can be omitted on the front side of the printed circuit board 34.

Since the above embodiments are described only for examples, the present invention is not limited to the above embodiments and various modifications or alterations can be easily made therefrom by those skilled in the art without departing from the scope of the present invention.

What is claimed is:

1. A LCD device comprising a LCD panel for displaying a picture image thereon, a light-conductive sheet disposed at a rear side of said LCD panel for conducting back light toward said LCD panel, a reflecting plate disposed at a rear side of said light-conductive sheet for reflecting the leakage back light passed through the rear surface of said light-conductive sheet, said reflecting plate having on a rear surface thereof a conductive film grounded, and a combination of a tape carrier package (TCP) and a printed circuit board coupled to a periphery of said LCD panel, said TCP being electrically connected to said LCD panel for driving said LCD panel for display of the picture image based on signals transferred through said printed circuit board, said printed circuit board being disposed at a rear side of said LCD panel by folding said TCPs toward the rear side of said LCD panel, said conductive film being disposed between said printed circuit board and said LCD panel.

2. The LCD device as defined in claim 1, wherein said printed circuit board has a rear ground pattern electrically connected to a conductive frame of the LCD device through a contact member.

3. The LCD device as defined in claim 1, wherein said printed circuit board has a front ground pattern electrically connected to said conductive film through a contact member.

4. The LCD device as defined in claim 3, wherein said contact member has a spring function.

5. The LCD device as defined in claim 1, wherein said conductive film is formed by evaporation.

6. The LCD device as defined in claim 1, wherein said conductive film is formed by plating.

7. The LCD device as defined in claim 1, wherein said conductive film is bonded onto the rear surface of said reflecting plate.

* * * * *